May 2, 1933.    U. S. McMILLAN    1,907,080
FIBROUS COMPOSITION AND METHOD OF MAKING THE SAME
Filed Sept. 30, 1929
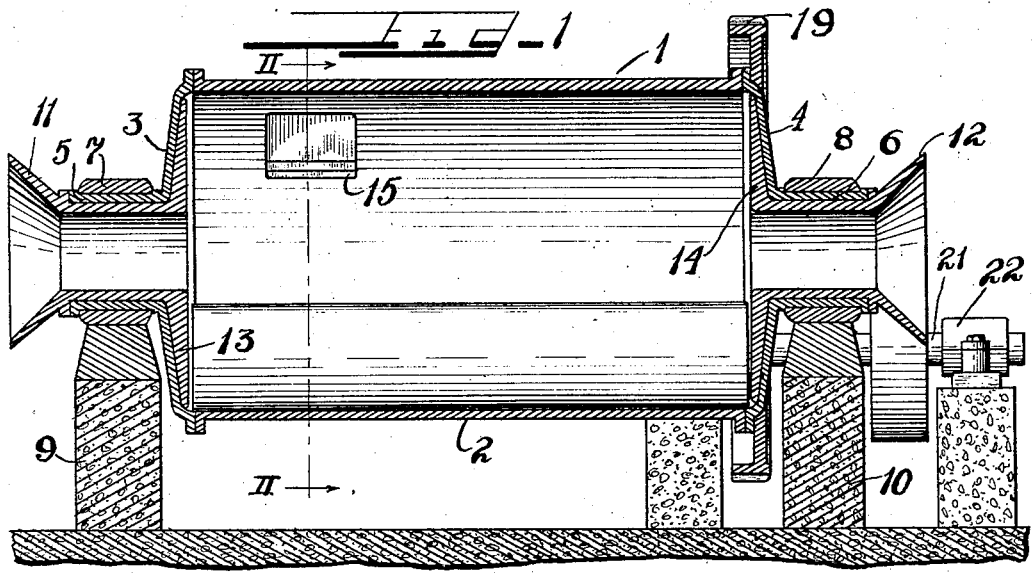
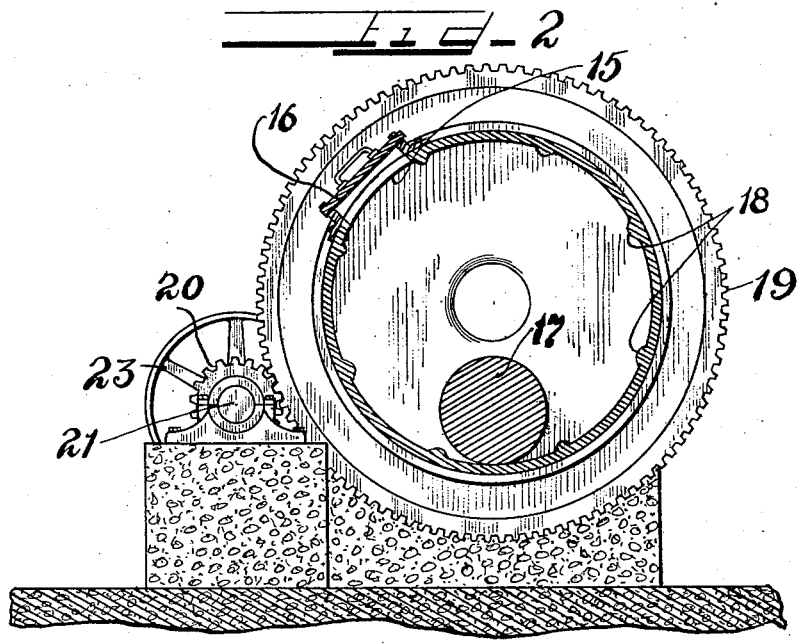
Inventor
Uel S. McMillan
By Charles T. Hill Attys Patented May 2, 1933

1,907,080

UNITED STATES PATENT OFFICE

UEL S. McMILLAN, OF CHICAGO, ILLINOIS, ASSIGNOR TO McMILLAN FIREPROOF FIBRE CO., OF CHICAGO, ILLINOIS, A CORPORATION OF ILLINOIS

FIBROUS COMPOSITION AND METHOD OF MAKING THE SAME

Application filed September 30, 1929. Serial No. 396,151.

This invention relates to a fibrous composition and to a method for the production thereof, and more particularly to a fireproof fibrous composition having in a wet state plastic properties.

It has heretofore been proposed to mix inorganic substances, such as finely divided mineral and cementitious particles, with fibrous vegetable material, either in the dry or wet form, for the purpose of uniting these substances and materials with each other to provide a composition for use in the building and insulating art. However, it has been impossible, in general, to effect such a bond between the mineral substance and the fibrous vegetable material as to prevent the natural separation of the two ingredients due to their differences in specific gravity, size and physical structure. Consequently, when such compositions are rendered plastic with water, they lack uniformity and structural strength due to the weakness of the bond between the ingredients.

It is therefore an object of this invention to provide a method for the production of an intimate mixture between an inorganic substance of a mineral or cementitious nature and fibrous vegetable material whereby an equalization in the specific gravity of the mineral and vegetable matter is effected to such an extent that in its plastic state the composition possesses the desired degree of uniformity and structural strength.

It is a further important object of this invention to provide a fire-proof composition composed of fibrous woody material impregnated with an inorganic substance adapted to render the composition plastic in a wet state, so that it may be used in the building art.

Other and further important objects of this invention will become apparent from the following description and appended claims.

In the drawing, which serves to illustrate a preferred embodiment of my method for the manufacture of a composition of the type herein described:

Figure 1 is a longitudinal sectional view of a mixing apparatus of a type similar to a rod mill.

Figure 2 is a sectional view taken substantially on line II—II of Figure 1.

As shown on the drawing:

The fibrous material used in the preparation of the composition of my present invention is preferably obtained by subjecting wood, vegetable stalks or the like to a defiberizing action such as described in my patent entitled "Apparatus for defiberizing wood" No. 1,476,032, dated December 4, 1923. According to the defiberizing method therein described, bolts or slabs of wood are subjected to a yielding combing action in line with the length of the fibers of the wood, or other vegetable material to produce a fibrous material of a fluffy, bulky nature. In accordance with my present invention, the fibrous, woody material thus prepared and in a dry state is transferred by any suitable means, preferably by an air blast, to the interior of a horizontal revolving drum similar to the usual rod mill and indicated as a whole by the reference numeral 1.

Said revolving drum 1 comprises a cylindrical shell 2 provided at its ends with heads 3 and 4 forming hollow trunnions 5 and 6, respectively, by means of which said drum is mounted for rotation. Said trunnions 5 and 6 are journaled in bearings 7 and 8, respectively, mounted upon supporting pedestals 9 and 10. Spouts 11 and 12 extend within said hollow trunnions 5 and 6, respectively, and are formed with inner flared ends 13 and 14 which conform with and reinforce the heads 3 and 4. Said spouts 11 and 12 serve for the introduction of the ingredients making up my composition.

The cylindrical shell 2 is provided with an opening 15 adapted to be closed by a cover 16, which when removed permits the finished product to be discharged from the drum.

A single, cylindrical roller 17 of substantially the same length as the shell 2 is positioned within said drum to rest freely upon the bottom thereof. The roller 17 is preferably of considerable weight so that it may produce a rolling and kneading action in conjunction with the inner surface of the shell 2 upon the mixture of ingredients introduced into the drum. In order to increase this rolling and kneading action, the inside surface of said shell 2 is preferably provided with a plurality of spaced, longitudinally extending cleats or ribs 18 which serve to raise the roller 17 from the inner surface of said shell at periodic intervals and then allow said roll to drop again into contact with said surface or onto the fibrous layer or mat of material to be impregnated.

Means for revolving the drum 1 may suitably comprise a gear ring 19 secured to the head 4 and adapted to mesh with and be driven by a second gear 20 mounted upon a stub shaft 21. Said shaft 21 is journaled in bearings 22 and adapted to be driven, as by means of a pulley 23.

In operation, after the fibrous material has been transferred to the drum 1 the inorganic substance with which the fibrous material is to be impregnated is added in a finely divided state in the amount desired. The proportions of inorganic substance added, which may be a dry cement, gypsum, magnesite, or other mineral substance of a cementitious nature, may vary within wide limits, say from 1 to 50%, but preferably about 25% by weight of cementitious material is added. The excess of cementitious material to be used will depend upon the purpose for which the product is intended.

During the revolution of the drum, the cylindrical roller 17 rolls and kneads the cementitious substance into the pores and voids of the fibrous material. As previously stated, the fibrous material is in a dry condition so that the pores, voids and minute air cells of the fibers become filled during this rolling and kneading in process with the cementitious powder. The powder is itself in a dry condition and furthermore is in a very fine state, preferably having been air-floated after being finely ground. The rolling and kneading process is continued until the fibrous material becomes fully impregnated with the cementitious powder, with the powder imbedded into the air cells and in the surfaces of the fibers. As a result, the finished product has a substantially uniform specific gravity closely approximating that of the cementitious particles. The product, for instance, sinks when added to water and the fibrous material no longer floats due to the fact that the cementitious particles are actually embedded in and closely bonded with the fibers.

Where the product is subsequently used for plastic purposes, as in the building art, the obtaining of a uniform wet mix is greatly facilitated by the fact that the cementitious particles and the fibrous material, being of substantially the same specific gravity, have no tendency to separate, but rather instead, form a uniform, practically homogeneous mass. Consequently, after the plastic mass has set, it has good structural strength, due to the closeness of the bond between the fibrous material and the cementitious particles. The setting of the cement mix occurs not only on the surface of and around the fibrous material, but within the pores thereof so that a very strong bond is provided.

It will be understood that the apparatus here illustrated in connection with my process is merely the type of apparatus that I prefer to use. Other types of apparatus adapted to provide a rolling and kneading in action may be employed, although I have found that the use of a single roller and drum as shown gives most satisfactory results. Any apparatus that includes in its operation a cutting or grinding action would not be so satisfactory, since these actions result in a sealing of the ends of the fiber and a closing of the fiber pores, whereby the impregnation of the fibrous material with the cementitious powder would be made impossible.

I am aware that many changes may be made and numerous details of construction may be varied through a wide range without departing from the principles of this invention, and I, therefore do not purpose limiting the patent granted hereon otherwise than necessitated by the prior art.

I claim as my invention:

1. The method of impregnating combed defiberized vegetable material with a powdered inorganic substance, which consists in subjecting said defiberized material in a dry state to a rolling and kneading action in the presence of a dry, finely powdered inorganic substance, whereby said substance is caused to enter into and fill the pores and voids of said defiberized material.

2. The method of preparing a fireproof, fibrous composition, which consists in rolling and kneading a finely powdered cementitious substance into the pores and voids of combed defiberized, woody material in a dry state.

3. The method of preparing a fireproof, fibrous composition, which comprises subjecting a mixture of a finely powdered cementitious substance and combed defiberized woody material to a rolling and kneading action between cylindrical surfaces.

4. An impregnated fibrous composition, comprising combed defiberized vegetable material having a finely powdered cementitious unset substance imbedded in the pores thereof and attached to the surfaces thereof.

5. An impregnated fibrous composition, comprising combed defiberized vegetable material having a finely powdered dry cementitious unset substance imbedded in the pores thereof and attached to the surfaces thereof, the union between said defiberized material and inorganic substance being such that the composition uniformly sinks in water.

6. A fire-proof composition having plastic properties when moistened, comprising a mixture of defiberized vegetable material and a dry cementitious unset substance, a portion of the latter being disposed within the pores and voids of said defiberized material.

7. A fire-proof composition having plastic properties when moistened, comprising a mixture of defiberized woody material and a dry cementitious unset substance, a portion of the latter being inseparably disposed within the pores and voids of said defiberized material.

8. An impregnated, fibrous composition comprising wood fibre combed lengthwise from wood and having a finely powdered dry cementitious substance embedded into the voids and cells thereof.

9. The method of preparing a fibrous composition which consists in mixing a defiberized vegetable material with a powdered cementitious substance and subjecting said mixture to a rolling, pressing and kneading action, said action being substantially non-grinding.

10. The method of preparing a fibrous composition which consists in mechanically separating the fibres of wood by a tearing or shredding process, mixing said separated fibres with a cementitious substance and subjecting said mixture to a rolling, pressing and kneading process.

In testimony whereof I have hereunto subscribed by name at Chicago, Cook County, Illinois.

UEL S. McMILLAN.